United States Patent
Roadknight et al.

(10) Patent No.: US 7,478,162 B2
(45) Date of Patent: Jan. 13, 2009

(54) COMMUNICATIONS NETWORK

(75) Inventors: Christopher Mark Roadknight, Suffolk (GB); Ian W Marshall, Suffolk (GB)

(73) Assignee: British Telecommunications public limited company, London (GB)

( * ) Notice: Subject to any disclaimer, the term of this patent is extended or adjusted under 35 U.S.C. 154(b) by 768 days.

(21) Appl. No.: 10/169,558

(22) PCT Filed: Jan. 24, 2001

(86) PCT No.: PCT/GB01/00272

§ 371 (c)(1),
(2), (4) Date: Jul. 8, 2002

(87) PCT Pub. No.: WO01/59991

PCT Pub. Date: Aug. 16, 2001

(65) Prior Publication Data

US 2003/0014538 A1    Jan. 16, 2003

(30) Foreign Application Priority Data

Feb. 8, 2000 (EP) .................................. 00300961
Mar. 31, 2000 (EP) .................................. 00302746

(51) Int. Cl.
*G06F 15/16* (2006.01)
*G06F 15/173* (2006.01)

(52) U.S. Cl. ................ 709/229; 709/226; 709/238

(58) Field of Classification Search ............ 709/238, 709/229, 226
See application file for complete search history.

(56) References Cited

U.S. PATENT DOCUMENTS

| 5,341,477 | A   |   | 8/1994  | Pitkin et al. |
| 5,539,883 | A   |   | 7/1996  | Allon et al. |
| 5,963,447 | A   | * | 10/1999 | Kohn et al. ............... 700/49 |
| 5,970,064 | A   |   | 10/1999 | Clark et al. |
| 6,226,273 | B1  | * | 5/2001  | Busuioc et al. ........... 370/270 |
| 6,272,544 | B1  | * | 8/2001  | Mullen .................... 709/226 |
| 6,310,883 | B1  |   | 10/2001 | Mann et al. |
| 6,393,474 | B1  | * | 5/2002  | Eichert et al. ............ 709/223 |
| 6,473,851 | B1  | * | 10/2002 | Plutowski ................... 713/1 |
| 6,477,150 | B1  | * | 11/2002 | Maggenti et al. ......... 370/312 |
| 6,490,255 | B1  | * | 12/2002 | Kiriha et al. ............. 370/254 |
| 6,628,610 | B1  | * | 9/2003  | Waclawsky et al. ....... 370/229 |
| 6,701,342 | B1  | * | 3/2004  | Bartz et al. .............. 709/200 |

(Continued)

FOREIGN PATENT DOCUMENTS

EP          0 384 339          8/1990

(Continued)

OTHER PUBLICATIONS

IBM Technical Disclosure Bulletin vol. 37, No. 2B Feb. 1994 pp. 215-217 Statistics Gathering and Analyzing Tool for Open Software Foundation's Distributed Computing Environment.

(Continued)

*Primary Examiner*—Kenny S Lin (57) ABSTRACT

An emergent network is autonomous at the service level. Network nodes have policies that enable them to process different types of service requests, with the processing earning the nodes 'rewards'. Successful nodes can pass some or all of their policies to other nodes using the evolutionary biology of bacteria as a model.

26 Claims, 5 Drawing Sheets

U.S. PATENT DOCUMENTS

| | | | |
|---|---|---|---|
| 6,728,748 B1 * | 4/2004 | Mangipudi et al. | 718/105 |
| 6,952,401 B1 | 10/2005 | Kadambi et al. | |
| 6,982,955 B1 | 1/2006 | Marshall et al. | |
| 2003/0177262 A1 | 9/2003 | Roadknight et al. | |
| 2004/0071147 A1 | 4/2004 | Roadknight et al. | |

FOREIGN PATENT DOCUMENTS

| | | |
|---|---|---|
| EP | 0889656 A3 | 11/2000 |
| EP | 1221786 A1 | 7/2002 |
| WO | WO 99/30460 | 6/1999 |
| WO | WO 00/33204 | 8/2000 |
| WO | WO 0159991 A2 | 8/2001 |
| WO | WO 02/23817 A1 | 3/2002 |
| WO | WO 03/017592 A1 | 2/2003 |
| WO | WO 03/034664 A1 | 4/2003 |

OTHER PUBLICATIONS

Chen et al Computer Journal vol. 39, No. 9, 1996, pp. 757-766 XP000720396 Threshhold-Based Admission Control policies for Multimedia Servers.

Goldszmidt 1998 IEEE Network Operation and Management Symposium Feb. 1998 vol. 3, Conf. 10, pp. 828-835 XP000793430 Load Management for Scaling up Internet Services.

IBM Technical Disclosure Bulletin vol. 38, No. 07, Jul. 1995 pp. 511-515 Dynamic Load Sharing for Distributed Computing Environment.

Paxson, V. et al., "Wide Area Traffic: The Failure of Poisson Modeling," IEEE/ACM Transactions on Networking, 3, (3), pp. 226-244, 1995.

Gribble S. et al., "System Design Issues for Internet Middleware Services: Deductions from a Large Client Trace," Proceedings of the USENIX Symposium on Internet Technologies and Systems, University of CA at Berkeley, (USITS '97), Dec. 1997.

M. Abrams et al., "Caching Proxies: Limitations and Potentials," Proc. 4th Inter. World-Wide Web Conference, Boston, MA, Dec. 1995.

Roadknight, C.M. et al., "Modeling Complex Environmental Data," IEEE Transactions on Neural Networks, 8, (4), p. 852-862, 1997.

Roadnight, C. et al., "Performance Implications of WWW Traffic Statistics," submitted to httjp:/www.wtc2000.org.

Darwin, C., *The Origin of the Species by Means of Natural Selection*, 1859, Dover Publications, New York, 2006.

Caldwell, D. et al., "Do Bacterial Communities Transcend Darwinism?," Advances in Microbial Ecology., vol. 15, p. 105-191, 1997.

Lenski, R. et al., "Dynamics of Adaptation and Diversification: A 10,000 Generation Experiment with Bacterial Populations," Proc. Natl. Acad. Sci. USA, vol. 91, pp. 6808-6814, 1994.

Kauffman, S. et al., "Divide to Coordinate: Coevolutionary Problem Solving," I ftp://ftp.santafe.edu/pub/wgm/patch.ps, 1994.

Fry, M. et al., "Application Level active networking,"Computer Networks 31, p. 655-667, 1999.

U.S. Appl. No. 10/380,003, filed Mar. 11, 2003, Roadknight et al.
U.S. Appl. No. 10/468,283, filed Aug. 19, 2003, Roadknight et al.
U.S. Appl. No. 11/629,204, filed Dec. 12, 2006, Roadknight.
U.S. Appl. No. 11/629,204, filed Dec. 2006, Roadknight.

International Search Report and Written Opinion dated Dec. 23, 2005.

International Searching Authority (Communication Relating to the Results of the Partial International Search dated Jun. 10, 2005.

UK Search Report dated Mar. 1, 2005.

UK Search Report dated Nov. 22, 2004.

Marshall et al., "Management of Future Data Networks", IEEE 2001, pp. 1143-1148.

Roadknight et al., "Future Network Management—A Bacterium Inspired Solution", circa 1997.

Boulis et al., Aggregation in Sensor Networks: An Energy-Accuracy Trade-Off, pp. 128-138, IEEE 2003.

Carle, "Energy-Efficient Area Monitoring for Sensor Networks", 20004 IEEE, pp. 40-46.

Munaretto et al., "Policy-Based Management of Ad Hoc Enterprise Networks", 2002.

Shen et al., "Adaptive Autonomous Management of Ad Hoc Networks", 2002 IEEE.

McGrath et al., "The Actcomm Project: Mobile Agents and Ad Hoc Routing Meeting Military Requirements for Information Superiority", pp. 413-417, 2001 IEEE.

Marshall et al., "Emergent Quality of Service—A Bacterium Inspired Approach", circa 1999.

Marshall et al., "Evolutionary Approaches to Management of Pervasive Computing", May 19, 2003, http://homepages.feis.herts.ac.uk/~nehaniv/EN/seec/abstracts/marshall.html.

Phanse et al., "Addressing the Requirements of QoS Management for Wireless Ad Hoc Networks", circa 2002.

Roadknight et al., "Management of Future Data Networks: An Approach Based on Bacterial Colony Behavior", circa 2001.

Roadknight et al., "Sensor Networks of Intelligent Devices", circa 2002.

Broch et al., "A Performance Comparison of Multi-Hop Wireless Ad Hoc Network Routing Protocols", MobiCom '98, Oct. 25-30, 1998.

Marshall et al., "Adaptive Management of an Active Service Network", BT Technology Journal, vol. 18, No. 4, Oct. 1, 2000, XP002175974.

Yang et al., "Building an Adaptable, Fault Tolerant, and Highly Manageable Web Server on Clusters of Non-Dedicated Workstations", Parallel Processing, 2000, Proceedings, 2000 International Conference on Aug. 21-24, 2000, pp. 413-420, XP002175975.

IBM Technical Disclosure Bulletin, vol. 37, No. 2B Feb. 1994, pp. 215-217, Statistics Gathering and Analyzing Tool for Open Software Foundation's Distributed Computing Environment.

IBM Technical Disclosure Bulletin, vol. 38, No. 7 Jul. 1995, pp. 511-515, Dynamic Load Sharing for Distributed Computing Environment.

International Search Report dated Oct. 31, 2001.

Colajanni et al., "Adaptive TTL Schemes For Load Balancing of Distributed WEB Servers", Performance Evaluation Review, Association for Computing Machinery, New York, NY, US, vol. 25, No. 2, Sep. 1, 1997, pp. 36-42, XP000199853.

Shimamoto et al., A Dynamic Routing Control Based on a Genetic Algorithm, Proceedings of the International Conference on Neural Networks (ICNN), San Francisco, Mar. 28-Apr. 1, 1993, New York, IEEE, US, vol. 1, Mar. 28, 1993, pp. 1123-1128, CP010111747.

* cited by examiner

Figure 5b ated the U.S.

COMMUNICATIONS NETWORK

This application is the U.S. national phase of international application PCT/GB01/00272 filed 24 Jan. 2001 which designated the U.S.

BACKGROUND

1. Technical Field

This invention relates to the field of network management and in particular the management of complex data communication networks.

2. Related Art

Communication networks such as the Internet are probably the most complex machines built by mankind. The number of possible failure states in a major network is so large that even counting them is infeasible. Deciding the state that the network is in at any time with great accuracy is therefore not possible. In addition, data networks such as the Internet are subjected to a mixture of deterministic and stochastic load (see V Paxson and S Floyd, "*Wide Area Traffic: The Failure of Poisson Modelling*", IEEE/ACM Transactions on Networking 3, (3), pp 226-244, 1995 & S Gribble and E Brewer, "*System Design Issues for Internet Middleware Services: Deductions from a Large Client Trace*", Proceedings of the USENIX Symposium on Internet Technologies and Systems (USITS '97), December 1997). The network's response to this type of traffic is chaotic (see M Abrams et al, "*Caching Proxies: Limitations and Potentials*", Proc. 4th Inter. World-Wide Web Conference, Boston, Mass., December 1995), and thus the variation of network state is highly divergent and accurate predictions of network performance require knowledge of the current network state that is more accurate than can be obtained. Future networks, which will have increased intelligence, will be even more complex and have less tractable management. A network management paradigm is required that can maintain network performance in the face of fractal demands without detailed knowledge of the state of the network, and can meet unanticipated future demands.

Biologically inspired algorithms (for example genetic algorithms [GAs] and neural networks) have been successfully used in many cases where good solutions are required for difficult (here, the term 'difficult' is used to represent a problem that is computationally infeasible using brute force methods) problems of this type (see C M Roadknight et al, "*Modelling of complex environmental data*", IEEE Transactions on Neural Networks. Vol. 8, No 4. P. 852-862, 1997 & D Goldberg, "*Genetic Algorithms in Search, Optimization and Machine Learning*", Addison-Wesley, 1989). They simulate evolutionary procedures or neural activation pathways in software, these then acting as problem solving tools. They can do this because they take a clean sheet approach to problem solving, they can learn from successes and failures and due to multiple adaptive feedback loops, they are able to find optima in a fractal search space quickly.

BRIEF SUMMARY

According to a first aspect of the present invention there is provided a multi-service communications network comprising more than one node, each node comprising one or more nodal policy and being configured to process one or more services in accordance with said one or more nodal policy, each nodal policy comprising;
(i) a service request identifier, said service request identifier determining the type of service request that may be processed by each respective node; and
(ii) one or more service request criteria, said service request criteria determining whether a type of service request defined by said service request identifier will be processed by each respective node characterised in that the processing of said one or more services determining an activity indicator of said node such that the node may vary one or more of the nodal policies in accordance with the activity indicator. It is preferred that if the activity indicator reaches a first upper threshold then the node may export one or more of the nodal policies. This provides the advantage that the policies of successful nodes to be exported for possible use by other nodes. Additionally, if the activity indicator reaches a second upper threshold then the node may replicate all of the nodal policies to generate a clone of the node. The second upper threshold may be a value of the activity indicator that is greater than the first upper threshold or it may be maintaining the first upper threshold for a given period of time. The advantage of this is that nodes which continue to be successful over longer periods are replicated, ensuring the survival of the fittest.

It is also preferred that if the activity indicator reaches a first lower threshold then the node may import a further nodal policy. This provides the advantage that the unsuccessful nodes may acquire policies from successful nodes in order to improve the unsuccessful nodes. Additionally, if the activity indicator reaches a second lower threshold then the node may repress an enabled nodal policy and enable a dormant nodal policy. The second lower threshold may be a value of the activity indicator that is lower than the first lower threshold or it may be maintaining the first lower threshold for a given period of time. This provides the advantage that unproductive policies can be discarded in order that other policies may be used. Furthermore, if the activity indicator reaches a second lower threshold and the node has no dormant nodal policies then the node may delete itself. The advantage of this is that nodes which continue to be unsuccessful over longer periods are removed from the network so that the processing of service requests can be concentrated on successful nodes.

Additionally, one or more of the variables within a nodal policy may be randomly varied, allowing the heterogeneity of nodal policies in the network to be advantageously increased. The multi-service communications network may be implemented as described above using a data carrier comprising computer code means.

According to a second aspect of the invention there is provided a method of upgrading a multi-service communications network such that the network can process an additional service, the network comprising more than one node, each node being configured to process one or more services in accordance with one or more nodal policies, each nodal policy comprising;
(i) a service request identifier, said service request identifier determining the type of service request that may be processed by each respective node; and
(ii) one or more service request criteria, said service request criteria determining whether a type of service request defined by said service request identifier will be processed by each respective node the method comprising the step of inserting an additional policy into the network, the policy being configured to enable a node to process the additional service. This provides the advantage that the network may be upgraded by simply adding a new policy that allows one or more of the network nodes to process the new service type. This removes any need to take the network, or some part of it down, in order for hardware and/or software to be replaced or reconfigured, as is presently required.

According to a third aspect of the invention there is provided a method of operating a multi-service communications network comprising more than one node, the method comprising the steps of
(a) each node processing one or more types of service requests in accordance with one or more nodal policies, each nodal policy comprising;
  (i) a service request identifier, said service request identifier determining the type of service request that may be processed by each respective node; and
  (ii) one or more service request criteria, said service request criteria determining whether a type of service request defined by said service request identifier will be processed by each respective node; characterised by the step of
(b) processing said one or more services to determine an activity indicator of said node such that the node may vary one or more of the nodal policies in accordance with the activity indicator.

One type of the service requests may be processed preferentially in accordance with an adapted nodal policy. It is preferred that the preferential processing of the service request is determined by a service request function, in which the service request function may be the time to live or alternatively the value derived from processing the service request.

BRIEF DESCRIPTION OF THE DRAWINGS

An exemplary embodiment of the invention will now be described, by way of example only, with reference to the following figures in which.

DETAILED DESCRIPTION OF EXEMPLARY EMBODIMENTS

Figure 1:
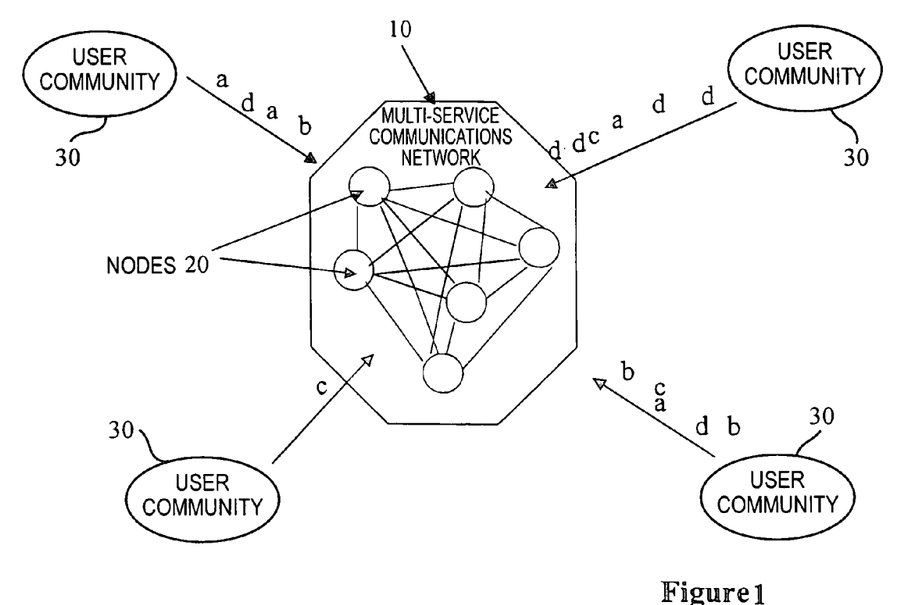
FIG. 1 shows a schematic depiction of a multi-service communications network according to an exemplary embodiment of the present invention.

FIG. 1 shows a multi-service communications network 10 that comprises a number of inter-connected nodes 20. These nodes are capable of performing one or more of a number of processes which are needed to support the multi-service network 10, for example an ATM switch, WWW server, IP router, SMTP mail server, domain name server (DNS), etc. The users of the multi-service network 10 are divided into a number of communities 30. These communities are geographically dispersed and have different requirements from the multi-service network, in terms of the type of request and the number of requests made (in FIG. 1, the different types of requests are indicated by the letters a, b, c & d, with each letter representing a request for a different service and the frequency of each letter representing the number of requests made for that service). Over time the number of communities 30 using the network 10 will vary and the nature and volume of network usage of each community will vary in a self-similar, deterministic way (see I Marshall et al, "*Performance implications of WWW traffic statistics*", submitted to http://www.wtc2000.org). Also, the number of services provided by the network will also vary over time as new services are introduced and some services become obsolete and are removed from the network.

One approach to managing such a network would be to make all nodes capable of processing all types of requests and with each node having sufficient capacity to be able to process all of the requests received at that node. However, this would lead to a very inefficient use of resources as virtually every node would be over-dimensioned and have an excess of capacity, both in terms of the type of service requests and the number of service requests that each node would be able to process.

Another approach would be to limit each node to processing a fixed subset of the different services supported by the network and providing a fixed capacity of processing capability for each service type at each node. By placing nodes which can process different types of traffic optimally within the network with respect to the type and number of service requests generated by the nearby communities it will be possible to meet most service requests. There will need to be some management layer within the network so that service requests can be "balanced" across the network, by sending service requests which can not be handled by local nodes to more distant nodes, as the service requests vary across the network. The disadvantage of this approach is that as communities change and the service requirements of the communities change, the location and/or the processing capabilities of the nodes will become less optimal, causing an increase in inter-nodal traffic as service requests are routed to an appropriate node, increasing the management overhead of the network. For a network having N inter-connected nodes there are $N^2$ inter-nodal relationships to manage, which makes such a management scheme intractable as N becomes large (for example, much larger than 1000).

According to an exemplary embodiment of the present invention the nodes shown in FIG. 1 are mostly autonomous and their behavior is driven by a set of policies that finds an analogy in the genetic structure of bacteria. This analogy is consistent with the metabolic diversity and the evolutionary responses of bacteria. The Darwinian mechanism of evolution involves a simple 'survival of the fittest' algorithm (C Darwin, "The Origin of the Species by Means of Natural Selection", New American Library, New York). While a Darwinian model is undoubtedly applicable to slowly changing species within a slowly changing environment, the lack of an intra-generational exchange of information mechanism causes problems when applied to environments experiencing very rapid changes.

Bacteria are a set of metabolically diverse, simple, single-cell organisms. Their internal structure is simpler than many other types of living cell, with no membrane-bound nucleus or organelles, and short circular DNA. This is because the genetic structure of bacteria is relatively simple. It has been demonstrated that only around 250 genes are required to code for an independent, self-sustaining bacterium, and highly competent bacteria, for whom the entire genome is known, have only 2000-3000 genes. As a result bacteria can reproduce within 30 minutes of 'birth'. It has been said that bacterial evolution 'transcends Darwinism' (D Caldwell et al, *"Do Bacterial Communities Transcend Darwinism?"*, Advances in Microbial Ecology. Vol. 15. p.105-191, 1997), with asexual reproduction ensuring survival of the fittest and a more Lamarkian (Lamark was an 18th century French scientist who argued that evolution occurs because organisms can inherit traits, which have been acquired by their ancestors during their lifetime) mechanism of evolution occurring in parallel, with individuals capable of exchanging elements of their genetic material, known as plasmids, during their lifetime in response to environmental stress, and passing the acquired characteristics to their descendants.

Plasmid migration allows much quicker reaction to sudden changes in influential environmental factors and can be modelled as a learning mechanism. Sustaining fitness in a complex changing fitness landscape has been shown to require evolution together with a fast learning mechanism. It is vital that the learning is continuous, and does not require off-line training as with many neural-net-based approaches. When a population of *E Coli* (a common bacterium) is introduced to a new environment, adaptation begins immediately (see R E Lenski and M Travisano *"Dynamics of Adaptation and Diversification"*, Proc. Nat Acad. Sci. 91: 6808-6814, 1994), with significant results apparent in a few days (i.e. O(1000) generations). Despite the rapid adaptation, bacterial communities are also remarkably stable. Fossils of communities (stromatolites) that lived 3.5 billion years ago in Australia appear identical to present day communities living in Shark Bay on Australia's west coast. Bacteria thus have many of the properties (simplicity, resilience, rapid response to change) that are desirable for network entities.

In similar biological systems such as protocists, where the probability of mutation occurring during the copying of a gene is around 1 in a billion, adaptive evolution can occur within 1 m generations (O(1000)yrs). GAs typically evolve much faster since the generation time is O(100) ms and the mutation rate is raised to 1 in a million but adaptation can still only deal with changes on a time-scale of O(10) s. Using bacterial learning (plasmid interchange) in a GA will improve this to O(10) ms, and substantially improve its performance when faced with rapid change.

The set of policies specifies which type of service request the node is able to process (e.g. a, b, c or d from FIG. 1), and a rule, or rules, that determine whether the node will accept a service request or not. Each node has a certain number of policies and these policies determine how the node responds to the changing environment of the network (in the same way as the genetic material of a bacterium determines how that bacterium responds to its environment). The policies take the form {x, y, z} where:

x is a function representing the type of service requested;

y is a function which determines whether a service request is accepted dependent upon the number of service requests queued at the node; and z is a function which determines whether a service request is accepted dependent upon the activity level of the node.

The 'value' that a node may derive from processing a service request would be receiving revenue from a user or network or service provider (this is analogous to a bacterium gaining energy from metabolising resources, such that the bacterium can survive and potentially reproduce). The quantum of revenue will depend upon the type of service request which is processed by the node, with some service requests being more important and hence providing greater reward when they are processed.

Each node may have any number of policies. Enabled nodes (i.e. a node that is processing service requests) will have one or more enabled policies (i.e. policies which are in use to determine the response of the node) and may also have a number of dormant policies (i.e. once enabled policies that are no longer used to determine the response of the node). Dormant policies may be re-enabled and enabled policies may be repressed, becoming dormant.

User requests for service are received by the node(s) nearest the point of entry to the network from the user community generating the service request. If the node is capable of processing the request then the request joins a queue, with each node evaluating the items that arrive in its input queue on a 'first in, first out' principle. If the service request at the front of the queue matches an available policy the service request is processed, the node is 'rewarded' (i.e. revenue is generated for the network or service operator) and the request is then deleted from the queue. If the service request does not match any of the node's enabled policies then the request is forwarded to an adjacent node and no reward is given. The more time a node spends processing service requests, the busier it is and the rewards (or revenue) generated by the node increases. Conversely, if a node does not receive many service requests for which it has an enabled policy then the node is not busy and little reward (or revenue) is being generated by that node. If a node which is receiving service requests, for which it has an enabled policy, at a greater rate than it is capable of processing those requests then the length of the queue of service requests will grow. This will lead to an increase in the time taken to process a service request and hence a poor service will be supplied to the user communities.

In order to reduce these unwanted effects it would be desirable for the nodes which are not busy and/or which have small queue lengths to able to acquire the traits of the nodes which are busy and/or have large queue lengths. One method by which this may be achieved is by adopting a scheme that is an analogue of plasmid migration in bacteria. Plasmid migration involves genes from healthy individuals being shed or replicated into the environment and subsequently being absorbed into the genetic material of less healthy individuals. If plasmid migration does not help weak strains increase their fitness they eventually die. Thus, if a node has a queue length or an activity indicator that reaches an upper threshold value then one of the node's policies is randomly copied into a 'policy pool' which is accessible to all nodes. Alternatively, the node may copy the most successful policy (in terms of generating revenue over a given recent period) or any other policy into the 'policy pool'. If a node has an activity indicator and/or a queue length that reaches a lower threshold then a policy is randomly selected from the policy pool and acquired by the node. If the policy pool is empty then the node must wait for a 'successful' node to add a policy to the policy pool. The threshold values (both upper and lower) need not be the same for the queue length as for the activity indicator.

If a node maintains the upper threshold value for the queue length or for the activity indicator for a given period of time (i.e. the node sustains its success) then the node can clone itself by producing another node having the same set of policies as the parent node. This is analogous to healthy bacterium with a plentiful food supply reproducing by binary fission to produce identical offspring. Alternatively, this cloning process may be initiated by the node's queue length or activity indicator reaching a second upper threshold value, this second upper threshold value being greater than the first upper threshold value. Conversely, if a node maintains the lower threshold value for the queue length or for the activity indicator for a given period of time (i.e. the idleness of the node is sustained) then some or all of the enabled policies of the node are deleted and any dormant policies are activated. If the node has no dormant polices then once all the enabled policies have been deleted then the node is switched off. This is analogous to bacterial death due to nutrient deprivation.

Following the analogy with bacterial evolution, it is believed that a slower rate of adaptation to the environmental changes is preferable to a faster rate of adaptation, as a faster rate may mean that the network nodes end up in an evolutionary 'blind alley', without the genetic diversity to cope with subsequent environmental changes. This can be achieved by favoring random changes in nodal policies rather than favoring the adoption of successful policies or the rejection of unsuccessful policies.

The other method by which the nodal policies may be varied is analogous to random genetic mutations which occur in bacterium. For example, policy mutation may involve the random alteration of a single value in a policy. If a policy were to have the form:

Accept request for service a if activity indicator<80% then permissible mutations could include (mutation indicated in bold);

Accept request for service c if activity indicator<80%, or
Accept request for service a if activity indicator<60%, or
Accept request for service a if queue length<80%.

Simulations have shown that single value mutations give rise to stable systems with fairly low rates of mutation. Whilst it would be possible to have multiple value mutations (e.g. 'Accept request for service a if activity indicator <80%' mutating to 'Accept request for service b if queue length <20%') this may lead to an unstable system. Results of simulations show that because of the long-term self-stabilizing, adaptive nature of bacterial communities, which is mimicked by the nodal policies, a network management algorithm based upon bacterial genetic structure and environmental responses provides a suitable approach to creating a stable network of autonomous nodes. The above approach makes each node within the network responsible for its own behavior, such that the network is modeled as a community of cellular automata. Each member of this community is selfishly optimizing its own local state, but this 'selfishness' has been proven as a stable community model for collections of living organisms (R Dawkins, "The Selfish Gene", Oxford University Press, 1976) and partitioning a system into selfishly adapting sub-systems has been shown to be a viable approach for the solving of complex and non-linear problems (S Kauffman et al "Divide and Coordinate: Coevolutionary Problem Solving", Thus overall network stability is provided by a set of cells that are acting for their own good and not the overall good of the network and this node self-management removes most of the high-level network management problems.

The inventors have implemented a simulation of a network according to the present invention (and of the kind described above). The simulation system supports up to ten different service types but in the interest of simplicity the following discussion will refer to a subset of four of these service types; A, B, C, D and is based upon a rectangular grid having 400 vertices (which is merely an exemplary value and not critical to the working of the invention). The system is initialized by populating a random selection of vertices with enabled nodes. These initial nodes have a random selection of policies which define how each node will handle requests for service. These policies have a number of variables and are represented by the form $\{x, y, z\}$ where:

x is a function representing the type of service requested;
y is a function between 0 and 200 which is interpreted as the value in a statement of the form Accept request for service [Val(x)] if queue length<Val(y); and z is an integer between 0 and 100 that is interpreted as the value in a statement of the form Accept request for service [Val(x)] if busyness<Val(z%)

A node having a number of policies is represented as $\{x_1,y_1,z_1:x_2,y_2,z_2:\ldots:x_i,y_i,z_i\}$ Requests are input to the system by injecting sequences of characters, which represent service requests, at each vertex in the array. If the vertex is populated by a node, the items join a node input queue. If there is no node at the vertex then the requests are forwarded to a neighboring vertex. Each node evaluates the service requests that arrive in its input queue on a 'first in, first out' principle. If the request at the front of a nodal queue matches an available rule then the request is processed, the node is rewarded for performing the request and the request is deleted from the input queue. If there is no match between the service request and the node's policies then the request is forwarded to another vertex and no reward is obtained by the node. Each node may only process four requests per measurement period (henceforth referred to as an epoch). The more time a node spends processing requests, the busier it is seen to be and the greater the value of its activity indicator. The activity indicator can be determined by calculating the activity in the current epoch, for example, if the node processed three requests in the current epoch, generating 25 'points' of reward for each processed request, then the activity indicator would be 75. However in order to dampen any sudden changes in behaviour due to a highly dynamic environment it is preferred to combine the activity indicator at the previous epoch with the activity indicator for the current epoch. It has been found for the simulated network that a suitable ratio for the previous indicator to the current indicator is 0.8:0.2. For example, if in this epoch the node has processed three requests with each generating 25 points, and the node had an activity indicator of 65 for the previous epoch then the activity indicator for the present epoch will be 67. It will be seen that the ratio between the two indicators will vary with each system and depend upon how dynamic the system is. It should be also noted that the selection of four processing steps per epoch is an arbitrary choice and that other values may be adopted for this parameter. Plasmid interchange, as described above, was modelled in the simulation and if, through the interchange of policies, a node has more than four enabled policies then the newest policy to be acquired is repressed (i.e. registered as now being dormant) so that no more than four policies are enabled at any time in a node (although this limit of four enabled policies is an arbitrary one and may be varied). If a node has 4 enabled polices and acquires one from the policy pool then the policy acquired from the pool will not be repressed, but one of the policies previously present will be repressed. Other selection criteria may be applied when repressing policies, e.g. repressing the least successful policy or the policy which has been enabled for longest, etc.

Currently, values for queue length and the time-averaged activity indicator are used as the basis for interchange actions, and evaluation is performed every five epochs. If the queue length or activity indicator is above a threshold then one of the node's policies is copied into a 'policy pool' accessible to all nodes. Both of the threshold values were 50 in this example and it is clear that this value is only an example, other threshold values may be selected and there is no need to have the threshold value for the queue length to be equal to that of the activity indicator. The threshold values will determine the number of nodes which can reproduce to occupy the system and should be chosen suitably to match the performance requirements of the system. If the node continues to exceed the threshold for four evaluation periods i.e. 20 epochs), it replicates its entire genome into an adjacent vertex where a node is not present, simulating reproduction by binary fission which is performed by healthy bacteria with a plentiful food supply. Offspring produced in this way are exact clones of their parent.

If the activity indicator is below a different threshold, for example 10, then the node is classified as idle and a policy is randomly selected from the policy pool and inserted into the node. If a node is 'idle' for three evaluation periods (i.e. 15 epochs), its enabled policies are deleted. If any dormant policies exist these are enabled, but if there are no dormant policies then the node is switched off. This is analogous to bacterial death by nutrient deprivation. For example, if a node having the policy {a,40,50:c,10,5} has an activity indicator of greater than 50 when it is evaluated, it will put a random policy (e.g. {c,10,5}) into the policy pool. If a node with the genome {b,2,30:d,30,25} is later deemed to be idle it may import that policy and become {b,2,30:d,30,25:c,10,5}. If the imported policy does not increase the activity indicator of the node such that the node is no longer idle then a further policy may be imported; if there is no further policy to be imported then the node may be deleted.

Figure 2A:
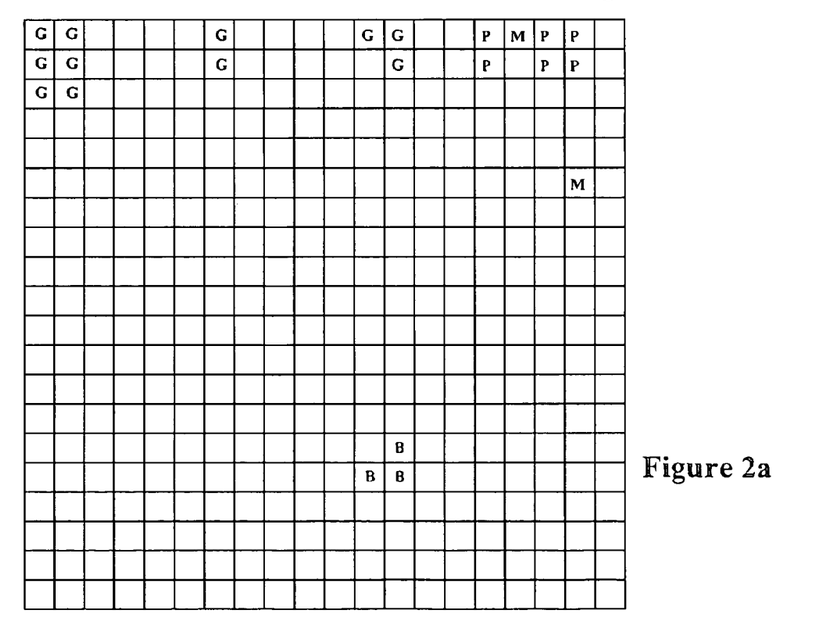
FIG. 2 shows a schematic depiction of the response of a multi-service communications network according to an exemplary embodiment of the present invention to different levels of network traffic.
Figure 2B:
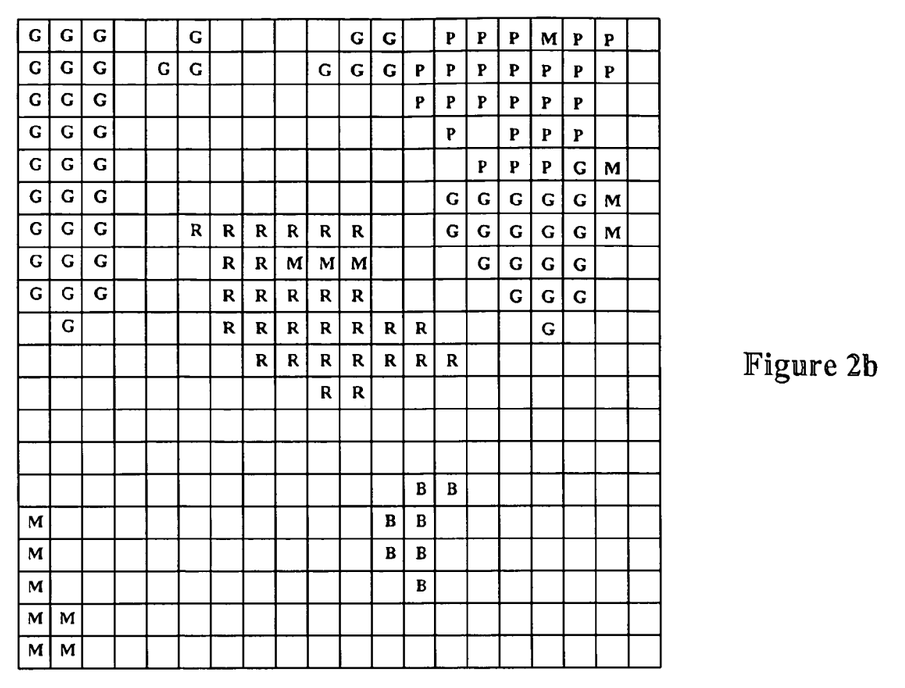
Figure 2C:
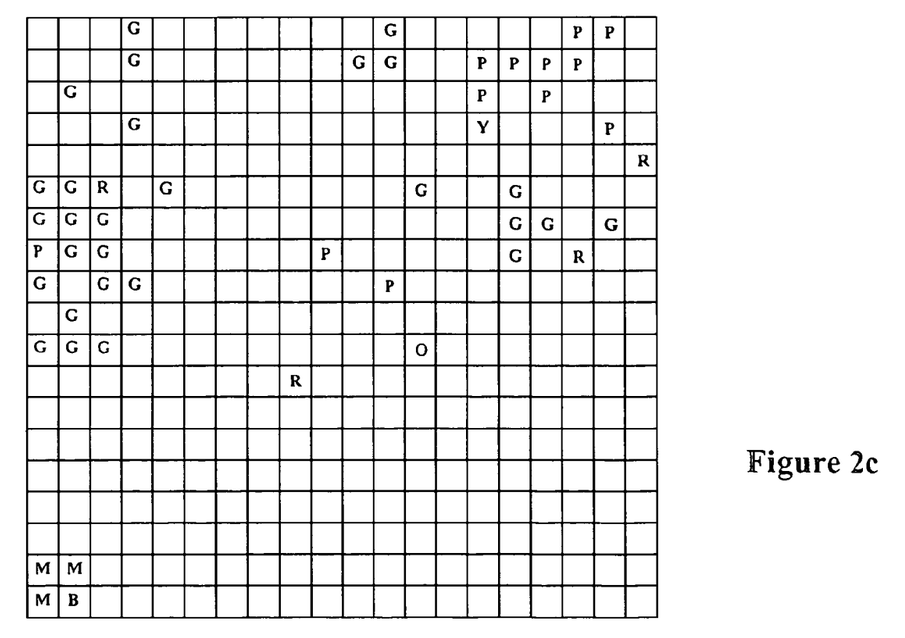

A visualization environment was created for this implemented simulation. The visualization environment provides an interface where network load and other parameters can be varied in many ways, thereby allowing stresses to be introduced into the system in a flexible manner. For instance, the ratio of requests for the four services can be made to vary over time, as can the overall number of requests per unit time. A 'petri dish' that can accommodate up to 400 nodes was used to display the system state. Rules governing reproduction and evolution, including plasmid migration (as described above), were introduced into the simulation, in an attempt to force the nodes to model the behaviour of bacterium in a changing environment. FIG. 2 shows what happens when an initial low load is increased and then reduced. Each strain of node that can process a single type of request is represented in the FIG. 2a by a code representing the color used to display the strain by the simulator, e.g. R [red], G [grey], B [blue], etc. When the load increases (FIG. 2b), the existing colonies increase in size and colonies of new strains of node appear due to mutation and plasmid migration. More complex strains with the ability to handle more than one service request type were depicted by a combination of these colors e.g. a node which could process the strains indicated by red and blue is indicated by P [purple] (see FIGS. 2a & 2b). FIG. 2c shows the response to a decrease in load. As in real bacterial communities a decrease in food causes a large amount of cell death, but also an increase in diversity (which is shown by the increase in the number of different node strains) as more plasmid migration and mutation occurs.

It will be immediately obvious that the control parameters given above are merely exemplary and are provided to illustrate the present invention. The optimal values of the different parameters will vary from system to system depending upon their size, dynamic constants, growth rates, etc.

The system described above has very significant advantages when it comes to adding new services to a multi-service network. Conventionally it is necessary to take the network down and add the required hardware, update software etc., so that the network is capable of carrying the new service(s). Using a network according to the present invention it is possible to provide new service by adding new functionality to existing nodes so that they can deal with the various service requests associated with the new service.

The simplest method of achieving this is to allow nodal policies to mutate so that a policy can process the new type of service request(s). If a policy mutates such that it can process a new service request type then the node will have an abundant food source, which will aid the distribution of the newly mutated policy through the nodal population, by plasmid migration and/or by reproduction. If the mutation leads to a node being able to process a service type which has not yet been introduced into the network then the node may well die out, leading to the suppression of the less useful mutation. It may be preferable to have some form of restriction on the extent of mutation allowable to try and minimize such an occurrence. Clearly, the mutation range for the policies must allow all of the service request types in use to be selected for.

Another method of enabling nodes to process new types of service request is to modify the policy set of an existing node so that it can handle the new service type. In order to do this it will be necessary to disable the node for a short period of time, but the distributed nature of the network means that other nodes will react to accommodate the missing node. It is possible to introduce the policy into the policy set either as an enabled policy or a dormant policy, although an enabled policy is more likely to be spread quickly through the network. Further methods of enabling the network to cope with new service types include the insertion of one or more new nodes which have a number of policies, some of which enable the new type of service request to be processed or the insertion of suitable policies into the policy pool, from where unsuccessful nodes may acquire these policies.

Figure 3A:
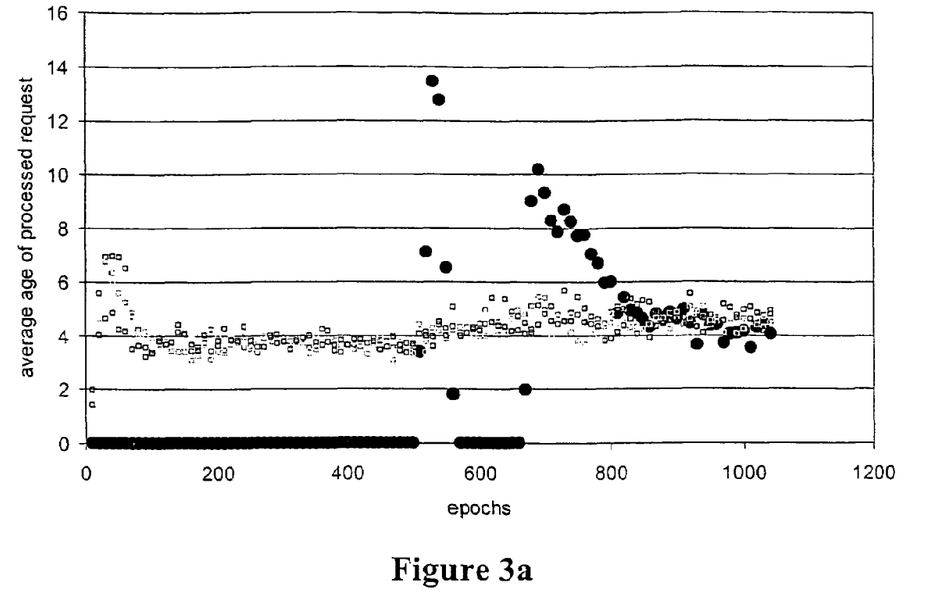
FIG. 3 shows a graphical depiction of the response of a multi-service communications network according to an exemplary embodiment of the present invention to the introduction of new service types to the network.
Figure 3B:
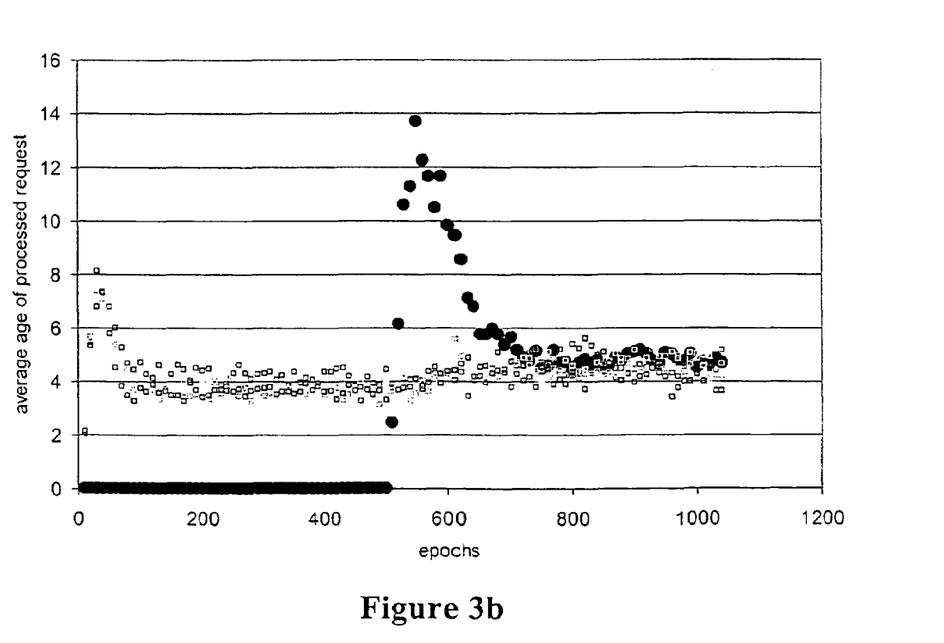

FIG. 3a shows the response of the simulation to the insertion of a new type of service requests at the same time that the nodal policies are allowed to mutate to process the new service type (the vertical line on the graph at approximately 500 epochs indicates the insertion of the new type of requests). The new type of service request is indicated by solid circles in FIG. 3a, with the other types of service request being represented by open squares. The average time to process the new type of service request rises sharply, as at first only a few nodes possess suitable nodal policies, but the average processing time falls as these policies are spread by migration and reproduction. The graph then drops to zero, which represents the policy being made dormant due to a lack of service requests being made. The average processing time for the new type of service request then rises again as the policy is re-enabled, and the average processing time soon reaches a steady state which is comparable to that of the other types of service request. FIG. 3b shows a similar graph which depicts the response of the simulation to the simultaneous introduction of a new type of service request and the injection of a suitable nodal policy into the policy pool. As before, the average processing time for the new type of service request rises steeply as service requests are made, but falls to a steady state value as the nodal policies for the new type of service request are spread through the network.

Due to the evolutionary nature of the network if a given service type is not used extensively then the number of nodes having suitable policies for that service type will decrease as the nodes die out or adapt to process other service types. If removal of an in use service type from the network is required, then the methods outlined above can be applied in reverse so that the nodal policies can not mutate such that the service type can be processed, applicable policies can be deleted from nodes or from the policy pool, etc.

The inventors have also implemented a second simulation of a network according to the present invention (and of the kind described above). This second simulation system can support up to ten different service types but the following discussion relates to a simulation using a subset of five of these service types; A, B, C, D & E and is based upon a rectangular grid having 400 vertices.

The details of the simulation are the same as for the first simulation described above, except that the value derived from processing a service request is different for each different service request: here processing service request A generates a reward of 40, processing service request B generates a reward of 35, processing service request C generates a reward of 30, processing service request D generates a reward of 25 and processing service request E generates a reward of 20. It takes 25 ms for a node to process any of the service requests, regardless of the type of the request and re-directing a service request from one node to another takes 4 ms. If a service request, for any type, is not accepted by a node for processing within 15 epochs (i.e. 1500 ms) then the service request is deleted from the queue for having exceeded its time to live value.

Figure 4A:
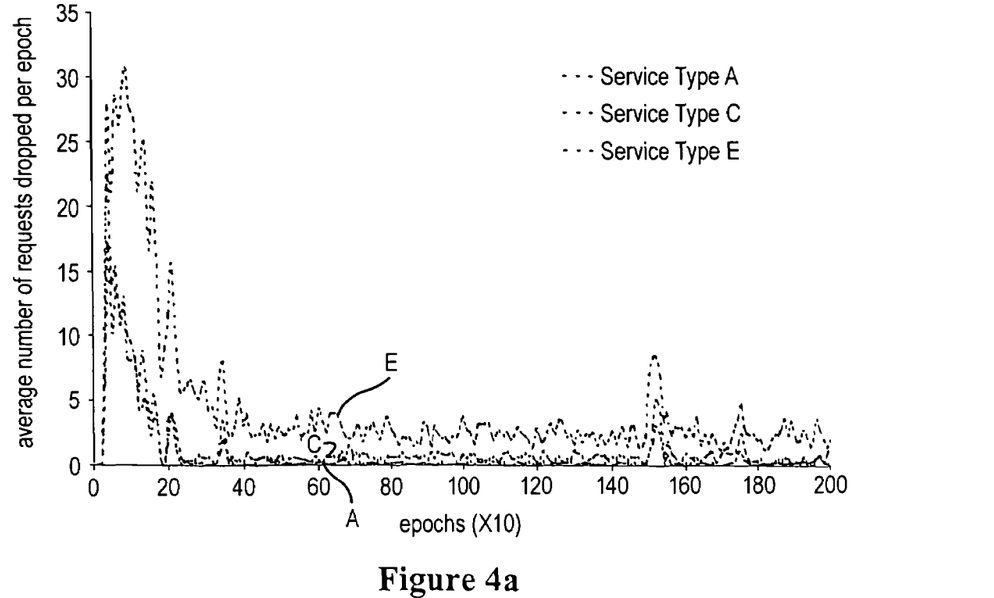
FIG. 4 shows a graphical depiction of the response of a multi-service communications network according to an exemplary embodiment of the present invention when different types of service request are assigned different processing values.

FIG. 4a shows the average number of requests that are dropped from nodal input queues during a simulation performed as described above. For the sake of clarity the traces indicating service types B and D have been omitted from the graph. All of the service types initially experience a large peak of dropped requests at the start of the simulation which is due to the number of nodes in the simulated network not being sufficient to process all of the service requests. As additional nodes are created through node replication the number of dropped service requests decreases until a steady state value is reached, although there is some perturbation about this steady state value with the occasional spike occurring in the graph. It will be noted that, in general, the greater the value derived from processing a service request, the fewer the number of requests that are dropped, i.e. the number of type A requests dropped is typically less than the number of type C requests dropped, and type E requests are dropped more often than the other types of request (this trend is followed by service types B & D although this is not shown in FIG. 4a).

Figure 4B:
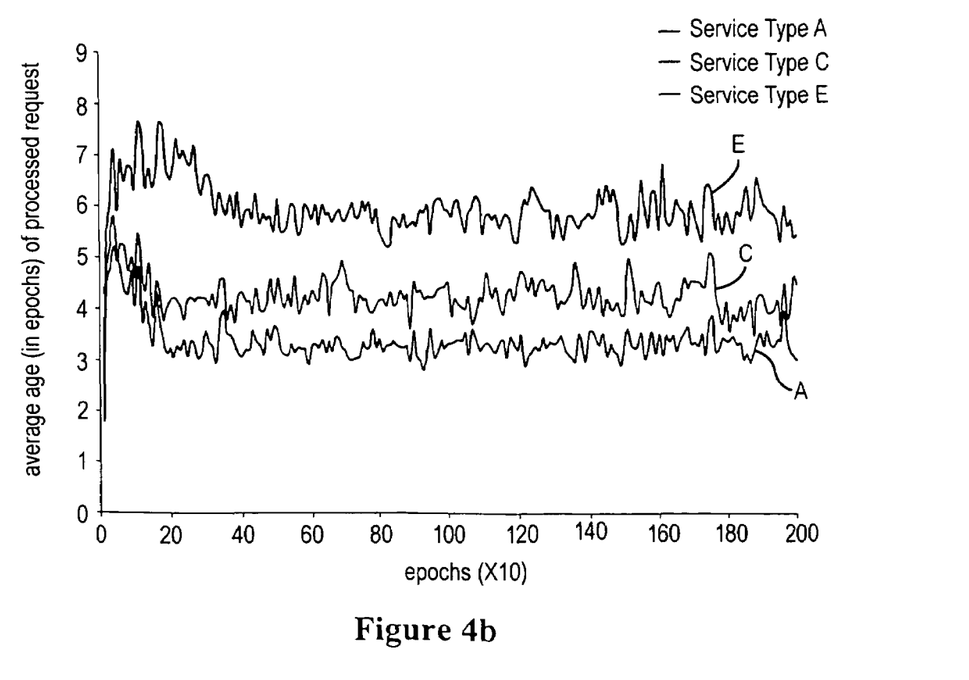

FIG. 4b shows the average age, in epochs, of service requests when they are processed by a node in the simulated network. The graph shows that a steady state value (albeit including some random fluctuation around the steady state value) is reached relatively quickly. The general trend indicated by FIG. 4b is that the greater the value derived from processing a service request, the lower the age of that request when it is processed, i.e. the higher value service types are processed in preference to the lower value service types. Thus, from FIG. 4b it can be seen that on average, type A service requests were processed faster than type C service requests and that type C service requests were processed faster than type E service requests (this trend is followed for service request types B & D although this is not shown in FIG. 4b).

Figure 5A:
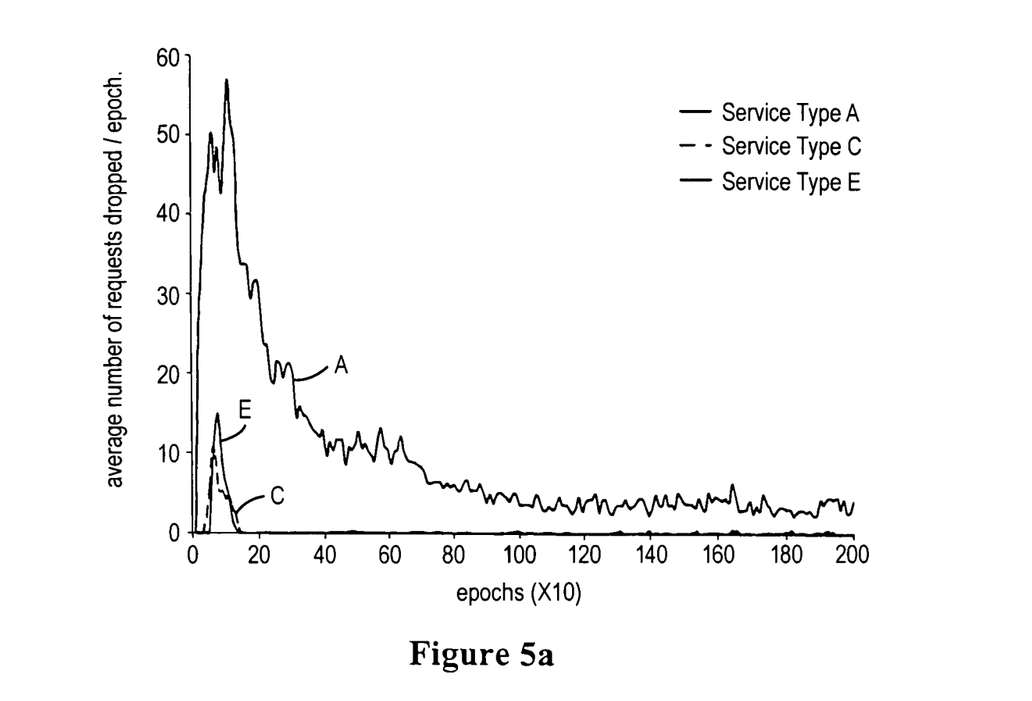
FIG. 5 shows a graphical depiction of the response of a multi-service communications network according to an exemplary embodiment of the present invention when different types of service request are assigned different time-to-live values.
Figure 5B:
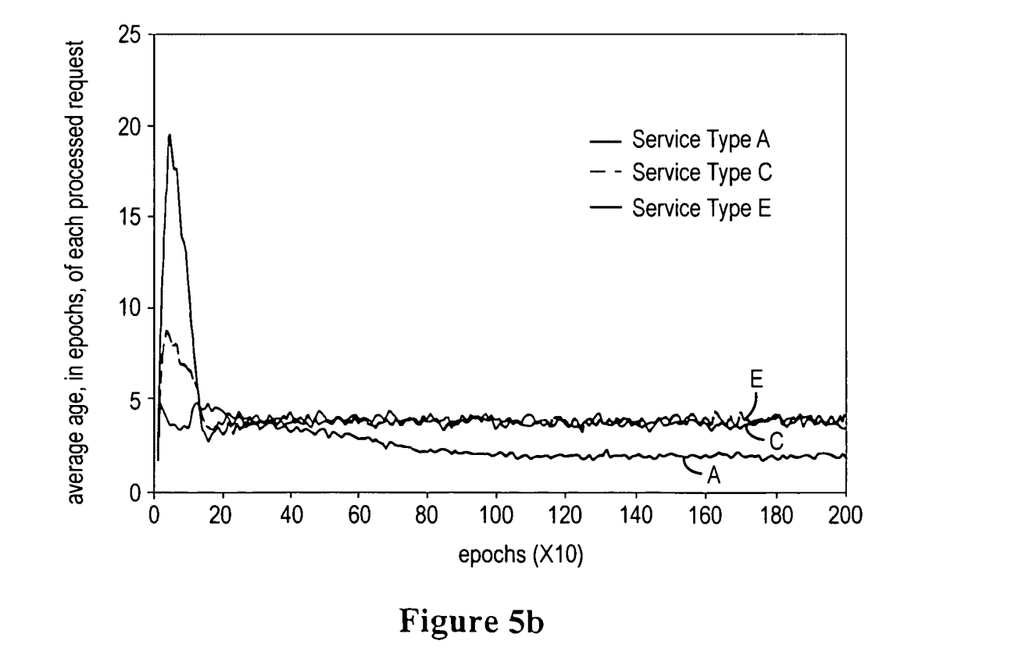

FIGS. 5a and 5b show results from a third experimental simulation, in which there are 5 different service types A-E, with the different service types being requested in equal proportions. The value derived from processing a service request is 25 points for all of the different service types and as in the second simulation described above each processing of a service request takes a node 25 ms and re-directing a service request to a different node takes 4 ms.

However, in this second simulation service type A has a time to live value of 10 epochs, service type B has a time to live value of 20 epochs, service type C has a time to live value of 30 epochs, service type D has a time to live value of 40 epochs and service type E has a time to live value of 50 epochs. All other aspects of the simulation such as the rules and thresholds relating to plasmid migration, policy export/import events, etc., are as described above for the second simulation.

FIG. 5a shows the average number of service requests dropped each epoch for service types A, C & E (the data for service types B & D have been excluded from the graph for the sake of clarity). FIG. 5a shows a relatively large spike in the average number of dropped service requests for all of the service types at the start of the simulation, which is due to the number of nodes in the simulated network not being sufficient to process all of the service requests. As additional nodes are created through node replication the number of dropped service requests decreases until a steady state value is reached. The average number of type A requests is significantly larger than for the other service types, both during the initial 'network growth' phase and the steady state phase of the simulation. Although during the 'network growth' phase the average number of type E service requests dropped is greater than the number of type C service requests dropped, the reverse is true in general during the steady state phase.

FIG. 5b shows the average age of the service requests when processed for the simulation discussed above. FIG. 5b shows an initial peak in the average age of the service requests, which is most pronounced in the trace for service type E, before an approximate steady state value is quickly reached The approximate steady state value for service type A is less than that of both types C & E, with the average value for type C service requests being marginally smaller than that for type E service requests. FIG. 5b indicates that the simulated network nodes have adapted to process preferentially the service requests which have a lower time to live.

It can be seen from the simulation results that it is possible to create different qualities of service within such a network by defining the value derived from processing a service request and/or the time to live for a service request. The quality of service (QoS) provided by the network may be controlled by the network operator or service provider defining constant values for these variables for different types of service request or having different classes of QoS available for the same service, with the user selecting a desired class of QoS. Alternatively, the users may choose a suitable level of QoS, or a cost level that they are prepared to pay, with this choice then being translated into a suitable combination of service request value and/or time to live. Additionally, the QoS process may be more transparent, with users selecting directly the service request value and/or time to live for some or all of their network transactions.

An example of such a multi-service network is as described by M Fry & A Ghosh, "*Application Level Active Networking*", available from http://dmir.socs.uts.edu.au/projects/alan/papers/cnis.ps. The network would contain a number of machine readable storage medium such as large scale active network nodes (ANNs), with each ANN comprising a large processor cluster, for example up to 200 processors, with each processor running a dynamic proxylet server (DPS) and around 10 Java virtual machines (JVMs), each of which contain one or more proxylets (a proxylet is a small program that implements an active network service, such as transcoding a data resource from one format to another e.g. from a QuickTime video stream to a RealPlayer video stream, or from CD format audio to MP3 format audio).

Each DPS controls and implements the algorithmic rules discussed above that determine the activity indicator levels at which nodes may reproduce, export nodal policies, import nodal policies, etc. The JVMs are the nodes (i.e. analogous to bacterium) with the proxylets (or policies pointing to the proxylets and authorizing execution) providing the nodal policies (i.e. the genes of the bacteria).

In use, the proxylets are mostly multi-user devices, but they may be installed and used by a single user. A proxylet may be installed by a user who then proceeds to load the proxylet by making suitable service demands (this is analogous to placing a nodal policy into a node and then injecting some requests for the service it represents). Only at very low traffic loads will a given proxylet not be present at all the ANNs, but this gives rise to efficient network resource utilization as proxylets are run only in response to user demand and are run at a convenient network location.

The nodes of the simulated network do not have any awareness of the concept of an ANN or the boundaries between the different ANNs that comprise a network. The main reasons for this is to minimize the complexity of the nodal operations and because of the fuzzy nature of the boundaries in a cluster model.

The simulation indicates that such an active network should be capable of implementation and that reasonable levels of performance achieved. The ability to manage the deployment of new services over such networks has also been successfully simulated.

The invention claimed is:

1. A multi-service communications network comprising more than one node, each node having storage means storing least one nodal policy and processing means operable to process at least one service corresponding to said at least one nodal policy, said network comprising:
   (i) a service request identifier means for determining the type of service request that is capable of being processed by each respective node; and
   (ii) at least one service request criteria means for determining whether a type of service request defined by said service request identifier means will be processed by each respective node;
   wherein the processing of said at least one service request criteria means determines an activity indicator of said node such that the node autonomously varies at least one of the nodal policies in accordance with the activity indicator and causes the node to thereafter behave differently in accordance with a changed algorithm of node operation such that a set of inputs will thereafter cause different node behavior as compared to node operation occurring before the variation in policy was effected.

2. A multi-service communications network as in claim 1 wherein if the activity indicator of a node reaches a first upper threshold then the node is permitted to export one or more nodal policies then active at that node.

3. A multi-service communications network as in claim 2 wherein if the activity indicator of a node reaches a second upper threshold then the node is permitted to replicate all nodal policies then active at that node to generate a clone of the node.

4. A multi-service communications network as in claim 3 wherein the second upper threshold value is greater than the first upper threshold value.

5. A multi-service communications network as in claim 3 wherein the second upper threshold value is maintenance of the activity indicator at or above the first upper threshold for a predetermined period of time.

6. A multi-service communications network as in claim 1 wherein if the activity indicator of a node is lowered to a first lower threshold then the node is permitted to import a further nodal policy.

7. A multi-service communications network as in claim 6 wherein if the activity indicator is lowered to a second lower threshold then the node is permitted to delete an enabled nodal policy and enable a dormant nodal policy.

8. A multi-service communications network as in claim 7 wherein the second lower threshold value that is lower than the first lower threshold value.

9. A multi-service communications network as in claim 7 wherein the second upper threshold value is maintenance of the activity indicator at or below the first lower threshold for a predetermined period of time.

10. A multi-service communications network as in claim 7 wherein if the activity indicator reaches a second lower threshold and the node has no dormant nodal policies then the node deactivates itself.

11. A multi-service communications network as in claim 1 wherein a variable within at least one of said at least one nodal policy is randomly varied.

12. A multi-service communications network as in claim 1 wherein at least one of the nodal policies is adapted to process preferentially one type of service request.

13. A multi-service communications network as in claim 12, wherein preferential processing of a service request is determined by a service request function.

14. A multi-service communications network as in claim 13 wherein the service request function is a time to live.

15. A multi-service communications network as in claim 13 wherein the service request function is a value derived from processing the service request.

16. A multi-service communications network as in claim 1, the communications network being configured to process an additional service by insertion of an additional nodal policy into the network.

17. A multi-service communications network as in claim 16 wherein the additional nodal policy is inserted into the multi-service communications network such that at least one of said nodes imports the additional nodal policy.

18. A multi-service communications network as in claim 17 wherein the additional nodal policy is inserted directly into at least one of said nodes.

19. A multi-service communications network as in claim 17 wherein when a new node is created and the additional nodal policy is inserted directly into said new node.

20. A method of operating a multi-service communications network comprising more than one node, the method comprising:
   (a) each node processing at least one type of service request corresponding to at least one nodal policy, each nodal policy comprising:
      (i) a service request identifier, said service request identifier determining the type of service request that is capable of being processed by each respective node; and
      (ii) at least one service request criteria, said service request criteria determining whether a type of service request defined by said service request identifier will be processed by each respective node; and
   (b) processing said at least one service determines an activity indicator of said node such that the node autonomously varies at least one of the nodal policies in accordance with the activity indicator and causing the node to thereafter behave differently in accordance with a changed algorithm of node operation such that a set of inputs will thereafter cause different node behavior as compared to node operation occurring before the variation in policy was effected.

21. A method of operating a multi-service communications network as in claim 20 wherein one type of service request is processed preferentially in accordance with a nodal policy.

22. A method of operating a multi-service communications network as in claim 21 wherein preferential processing of a service request is determined by a service request function.

23. A method of operating a multi-service communication network as in claim 22 wherein the service request function is a time to live.

24. A method of operating a multi-service communications network as in claim 22 wherein the service request function is a value derived from processing the service request.

25. A method of operating a multi-service communications network as in claim 20 wherein at least one of the nodal policies is varied in accordance with the activity indicator by importing a new additional policy, recently inserted into the network, whereby the node, and thus the network as a whole, becomes enabled to process an additional service.

26. A tangible machine readable storage medium comprising computer code for implementing a method of operating a multi-service communications network according to claim 20.

* * * * *